(12) United States Patent
Nassaux et al.

(10) Patent No.: US 8,413,999 B2
(45) Date of Patent: Apr. 9, 2013

(54) WHEELED APPARATUS HAVING MULTIPLE WHEELBASE CONFIGURATIONS

(76) Inventors: Philippe P. Nassaux, Austin, TX (US); Jefferson W. Raley, Austin, TX (US)

( * ) Notice: Subject to any disclaimer, the term of this patent is extended or adjusted under 35 U.S.C. 154(b) by 451 days.

(21) Appl. No.: 12/799,156

(22) Filed: Apr. 20, 2010

(65) Prior Publication Data
US 2010/0270763 A1    Oct. 28, 2010

Related U.S. Application Data (60) Provisional application No. 61/171,698, filed on Apr. 22, 2009.

(51) Int. Cl.
*B62B 3/02*    (2006.01)

(52) U.S. Cl. .............. 280/47.2; 280/47.16; 280/47.18; 280/47.27; 280/47.33

(58) Field of Classification Search ............ 280/47.34, 280/47.35, 47.371, 47.131, 47.17, 47.18, 280/47.19, 47.24, 47.27, 47.28, 30, 638–639, 280/651, 654, 655; 414/490; 248/125.8, 248/129, 139; 403/187–188, 346, 396; D34/24–26
See application file for complete search history.

(56) References Cited

U.S. PATENT DOCUMENTS

| | | | |
|---|---|---|---|
| 3,647,236 A | 3/1972 | Hayes | |
| D273,522 S | 4/1984 | Zastera | |
| 4,681,330 A * | 7/1987 | Misawa | 280/47.2 |
| 4,921,270 A | 5/1990 | Schoberg | |
| 5,160,153 A * | 11/1992 | Zan | 280/43.1 |
| 5,207,439 A | 5/1993 | Mortenson | |
| 5,277,439 A | 1/1994 | Pipes et al. | |
| 5,474,312 A * | 12/1995 | Starita et al. | 280/47.19 |
| 5,536,034 A | 7/1996 | Miller | |
| 5,647,720 A | 7/1997 | Golicz et al. | |
| 5,810,373 A * | 9/1998 | Miranda | 280/47.2 |
| 6,308,967 B1 | 10/2001 | Stallbaumer et al. | |
| 6,328,319 B1 | 12/2001 | Stahler, Sr. | |
| 6,364,328 B1 | 4/2002 | Stahler, Sr. | |
| 6,848,881 B2 | 2/2005 | Henry | |
| 6,880,835 B2 | 4/2005 | Tornabene et al. | |
| 6,929,443 B1 | 8/2005 | Nellis | |
| 7,083,174 B2 * | 8/2006 | Kane | 280/47.2 |
| 7,500,682 B1 | 3/2009 | Del Marmol | |
| 8,100,430 B2 * | 1/2012 | Meyers et al. | 280/651 |

* cited by examiner

*Primary Examiner* — John Walters
*Assistant Examiner* — James Triggs
(74) *Attorney, Agent, or Firm* — David O. Simmors

(57) ABSTRACT

A wheeled apparatus has a pair of first-size wheels attached in a spaced apart arrangement to a main frame at its first end portion. A subframe is moveably attached at its first end portion to the main frame at a position between the first-size wheels and a second end portion of the main frame. The subframe is attached to the main frame for allowing the subframe to be freely moved between a first position and a second position. The subframe and the main frame jointly limit movement of the subframe to be between the first and second positions. A pair of second-size wheel is attached to a second end portion of the subframe. The first-size and second-size wheels jointly provide a first wheelbase length when the subframe is in the first position and jointly provide a second wheelbase length when the subframe is in the second position.

32 Claims, 6 Drawing Sheets

WHEELED APPARATUS HAVING MULTIPLE WHEELBASE CONFIGURATIONS

CROSS REFERENCE TO RELATED APPLICATIONS

This patent application claims priority from U.S. Provisional Patent Application having Ser. No. 61/171,698; filed Apr. 22, 2009; entitled "System And Apparatus For A Mobile Wheeled Truck", having a common applicant herewith and being incorporated herein in its entirety by reference.

FIELD OF THE DISCLOSURE

The disclosures made herein relate generally to the field of hand trucks and carts (collectively referred to herein as hand trucks) and, more particularly, to hand trucks with a plurality of wheels on a main frame thereof and one or more other wheels on a subframe thereof movably attached to the main frame in a manner allowing the subframe to be moved between multiple position with respect to the main frame.

BACKGROUND

Hand trucks and carts are used to transport a wide variety of objects such as boxes, gas cylinders, welding equipment, tools, mechanical parts and other items. Most of these hand trucks are either a 2-wheel design or a 4-wheel design. However, some hand trucks can convert from a 2-wheel configuration to a 4-wheel configuration.

An example of a known 2-wheeled hand truck is disclosed in U.S. Pat. No. D273,522. With such a 2-wheel hand trucks, an operator of the 2-wheel hand truck maintains a main frame of the 2-wheel hand truck in a tilted orientation with respect to the ground (e.g., at approximate a 45-degree angle) when carrying a load on a load platform of the 2-wheel hand truck. As such, a load carried on the load platform of a 2-wheel hand truck is always partially supported by the operator when the 2-wheel hand truck is in its mobile (i.e., tilted) position. The need for the operator to partially support the load when a 2-wheel hand truck is in a mobile position can result in the operator becoming strained and/or fatigued. It also means the operator's hands are not free for other tasks, such as opening doors, ensuring the load remains securely positioned on the load platform, etc.

The objective of maintaining a 2-wheel hand truck in a tilted orientation is to position a center of gravity of the load over the rotational axis (e.g., axle) of the wheels. Positioning the load in such a manner minimizes the effective weight that the operator is supporting. However, the shape of the load and/or it's position on the load platform can dictate its center of gravity relative to the location of the load on the load platform, thereby reducing the "leverage effect" provided by a 2-wheeled hand truck. Similarly, it is not always practical or possible for an operator to maintain a 2-wheel hand truck in an optimized tilted position (e.g., during certain maneuvers, when traversing certain obstacles (e.g., stair), etc). As such, an optimized leverage effect of a 2-wheel hand truck can be highly independent of a tilt angle preferred or required by an operator.

In an effort to overcome limitations and drawbacks of 2-wheel hand trucks, various 4-wheel hand trucks have been devised. Such 4-wheel hand trucks support an entire portion of a load when in a mobile position. However, the wheelbase of a 4-wheel hand truck is generally fixed, thereby making them less maneuverable than a 2-wheel hand truck. Furthermore, the frame structure of a 4-wheel hand truck is typically more cumbersome and/or complex than a 2-wheel hand truck. Still further, 4-wheel hand trucks can be less useful when certain obstacles/situations present themselves (e.g., traversing stairs). An example of a known 4-wheeled hand truck is disclosed in U.S. Pat. Nos. 5,277,439 and 6,848,881.

In an effort to overcome limitations and drawbacks of 2-wheel hand trucks and 4-wheel hand trucks, 2-to-4 wheel convertible hand trucks have been devised. In one manner or another, these 2-to-4 wheel convertible hand trucks can be selectively configured and/or used as a 2-wheel hand truck or a 4-wheel hand truck. When in a 2-wheel configuration, a load can be supported in much the same manner as with a 2-wheel hand truck, as discussed above. When in a 4-wheel configuration, a load can be supported in much the same manner as with a 4-wheel hand truck, as discussed above. Many of these 2-to-4 wheel convertible hand trucks require latching mechanisms or can require reconfiguration of the hand truck's frame for switching between 2-wheel operation and 4-wheel operation. Furthermore, conversion between wheel configurations can sometimes require that there is no load on the hand truck (e.g., secondary wheels are not attached to the main frame in such a way that they pivot freely). Still further, when in the 4-wheel configuration, the wheelbase is generally a relatively long (e.g., extended) and there is not a secondary 4-wheel configuration short wheelbase use configuration. As such, 2-to-4 wheel convertible hand trucks are often cumbersome to provide both 2-wheel and 4-wheel operations, which can be a considerable disadvantage in situations where a load is being moved across a flat surface and then needs to be transported over obstacles (e.g., up or down stairs). Examples of such known 2-to-4 wheel convertible hand trucks are disclosed U.S. Pat. Nos. 3,647,236; 4,921,270; 5,207,439 6,308, 967; 6,328,319; and 6,364,328.

Therefore, a hand truck offering 2-to-4 wheel conversion functionality in a manner that overcomes shortcomings associated with prior art hand trucks would be advantageous, desirable and useful.

SUMMARY OF THE DISCLOSURE

A wheeled apparatus configured in accordance with the present invention (e.g., a hand truck, grocery cart, etc) provided a variable length wheelbase between forward and rear wheels. Advantageously, such variable length wheelbase can be selectively altered while the apparatus is loaded and while the wheeled apparatus is being moved across a support surface (e.g., across a floor). During use, the weight of the wheeled apparatus and its load maintain the wheeled apparatus in a given wheelbase use configuration. The wheelbase of the wheeled apparatus can be user-selected for offering stability and/or maneuverability during use of the wheeled apparatus (e.g., while rolling the apparatus). In one specific example, the user-selectable wheelbase can be selectively switched between a wheelbase that optimized stability while rolling (long wheelbase use configuration) and a wheelbase that offers stability and control while traversing an obstacle such as steps (short wheelbase use configuration). A key aspect to the present invention is that such altering of the wheelbase is performed while holding a hand gripping portion of the wheeled apparatus and without the need for manipulating any separate actuators or controls. The user need only momentarily and slightly change a tilted orientation and speed of the wheeled apparatus for changing the wheeled apparatus between the first and second wheelbase use configurations. The loads "center of gravity" over the wheels also influences whether the wheeled apparatus will be in the short-base configuration or the long-base configuration.

Figure 1:
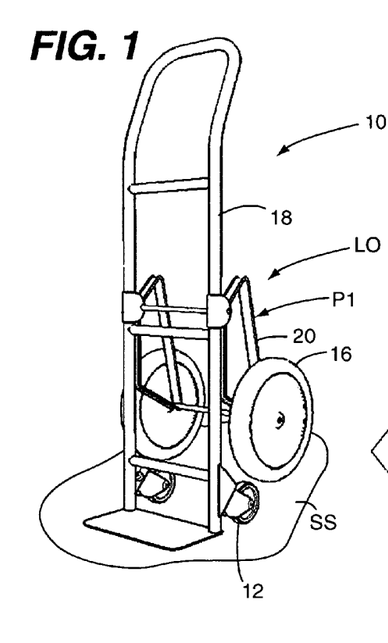
FIG. 1 is a perspective view showing a hand truck configured in accordance the present invention, wherein the hand truck is in a vertical loading orientation.
Figure 2:
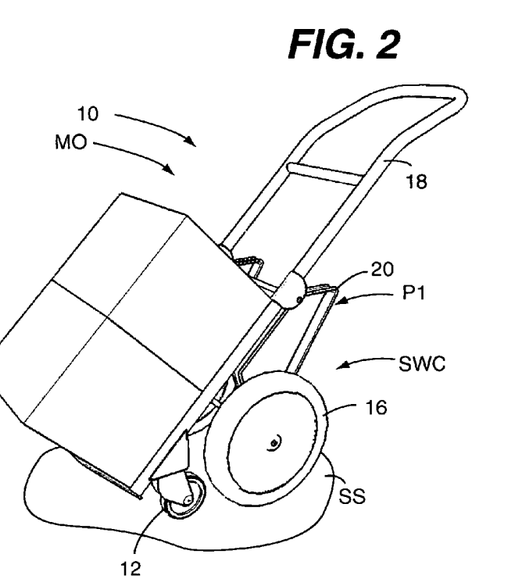
FIG. 2 shows the hand truck of FIG. 1 in a short wheelbase use configuration.
Figure 3:
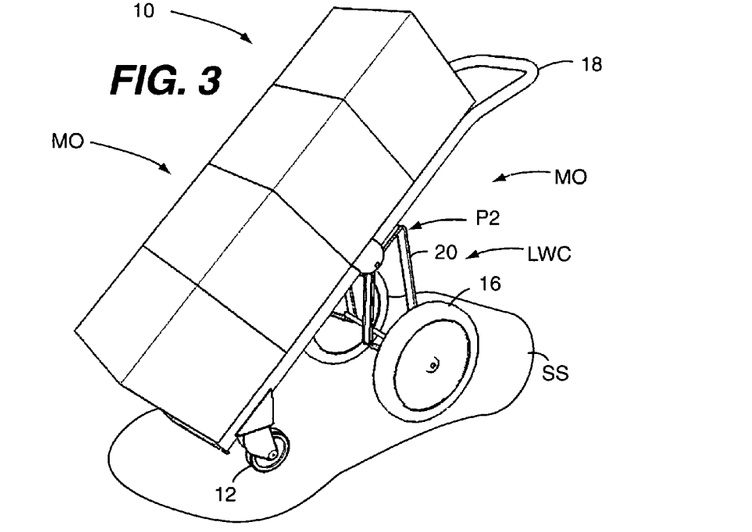
FIG. 3 shows the hand truck of FIG. 1 in a long wheelbase use configuration.

A hand truck configured in accordance with the present invention (i.e., hand truck 10) is shown in FIGS. 1-3. In a loading orientation LO (FIG. 1), front wheels 12 are adjacent the support surface SS (e.g., floor) and contact the support surface SS before rear wheels 16. Beneficially, the relatively small-diameter of the front wheels 12 provide for reduced lift-over height (i.e., leverage effect resulting from diameter of front wheels 12) associated with moving the hand truck 10 from its loading orientation LO to its mobile orientation MO (FIGS. 2-3). This reduced lift-over height (i.e., reduced relative to conventional hand trucks) reduces operator strain when moving the hand truck 10 from its loading orientation LO to its mobile orientation MO. Once in its mobile orientation MO in which the front wheels 12 and the rear wheels 16 are engaged with the support surface SS, an operator of the hand truck 10 selectively change the hand truck 10 between its short wheelbase use configuration SWC (FIG. 2) and its long wheelbase use configuration LWC (FIG. 3) by momentarily and slightly changing a tilted orientation and velocity of the hand truck 10. To change the hand truck 10 from its short wheelbase use configuration SWC to its long wheelbase use configuration LWC, the operator momentarily accelerates (e.g., slightly increasing its speed when moving forward) or moves the hand truck 10 forward from rest while applying a slight upward force on a main frame 18 of the hand truck 10, thereby causing a subframe 20 that is pivotably attached to the main frame 18 to move from a first subframe position P1 with respect to the main frame 18 to a second subframe position P2 with respect to the main frame 18. Similarly, to change the hand truck 10 from its long wheelbase use configuration LWC to its short wheelbase use configuration SWC, the operator momentarily decelerates the hand truck 10 (e.g., slightly decreasing its speed when moving forward) or moves the hand truck 12 rearward from rest while applying a slight upward force on a main frame 18 of the hand truck 10 the subframe 20, thereby causing the subframe 20 to move from the second subframe position P2 to the first subframe position P1. Advantageously, the operator does not have to support any portion of the weight of the load when the hand truck 10 is its mobile orientation MO.

In one embodiment of the present invention, a hand truck comprises a main frame, a load platform, a pair of first-size wheels, a subframe, and one or more second-size wheels. The load platform is attached to the first end portion of the main frame. The load platform extends forward of a front side of the main frame. The pair of first-size wheels is attached in a spaced apart arrangement to the main frame at the first end portion thereof. The first-size wheels are located on a rear side of the main frame. The first-size wheels are each pivotably attached to the main frame for being pivoted about a pivot axis extending substantially perpendicular to a rotational axis of a respective one of the first-size wheels and extending in a substantially skewed orientation with respect to a load support surface of the load platform. The subframe is pivotably attached at a first end portion thereof to the main frame at a position between the first-size wheels and a second end portion of the main frame. The subframe is attached to the main frame in a manner for allowing the subframe to be freely pivoted between a first position and a second position with respect to the main frame. The subframe and the main frame jointly limit movement of the subframe to be between the first and second positions thereof. The one or more second-size wheels attached to a second end portion of the subframe. A maximum diameter of the one or more second size wheels is equal to or greater than a maximum diameter of the first-size wheels.

In another embodiment of the present invention, a hand truck comprises a main frame, a load platform, a pair of first-size wheels, a subframe, and a pair of second-size wheels. The load platform is attached to a first end portion of the main frame. The load platform extends forward of a front side of the main frame. The pair of first-size wheels is attached in a spaced apart arrangement to the main frame at the first end portion thereof. The first-size wheels are located on a rear side of the main frame. The first-size wheels are each pivotably attached to the main frame for being pivoted about a pivot axis extending substantially perpendicular to a rotational axis of a respective one of the first-size wheels and extending in a substantially skewed orientation with respect to a load support surface of the load platform. The subframe is pivotably attached at a first end portion thereof to the main frame at a position between the first-size wheels and a second end portion of the main frame. The subframe is attached to the main frame in a manner for allowing the subframe to be freely pivoted between a first position and a second position with respect to the main frame. The subframe and the main frame jointly limit movement of the subframe to be between the first and second positions thereof. The pair of second-size wheels is attached in a spaced apart arrangement to a second end portion of the subframe. A maximum diameter of the second-size wheels is equal to or greater than a maximum diameter of the first-size wheels. The first-size and second-size wheels all simultaneously sit on a common reference plane when the subframe is in the first position thereof while the first-size wheels are in any pivoted position with respect to the pivot axis thereof and simultaneously sit on the common reference plane when the subframe is in the second position thereof while the first-size wheels are in any pivoted position with respect to the pivot axis thereof. A load support surface of the load platform is substantially skewed with respect to a reference plane simultaneously extending through a rotational axis of the second-size wheels when the subframe is in the first position and through the rotational axis of the second-size wheels when the subframe is in the second position.

In another embodiment of the present invention, a hand truck comprises a chassis, a pair of casters, and a wheelbase varying assembly. The chassis includes an elongated frame and a load support structure attached to the elongated frame at a first end portion thereof. The load support structure extends forward of a front side of the frame. The pair of casters is pivotably attached in a spaced apart arrangement to the frame at the first end portion thereof. A wheel of each one of the casters is a first-size wheel. The casters are located on a rear side of the frame. The casters each pivot about a pivot axis extending substantially perpendicular to a rotational axis of a respective one of the caster wheels and extending in a substantially skewed orientation with respect to a load support surface defined by the front side of the frame. The wheelbase varying assembly includes a wheel attachment structure and a pair of second-size wheels having a maximum diameter equal to or greater than a maximum diameter of the first-size wheels. The wheel attachment structure is pivotably attached at a frame mounting portion thereof to the frame at a position between the casters and a second end portion of the frame in a manner allowing the wheel attachment structure to be freely pivoted about a pivot axis thereof. The frame and the wheel attachment structure jointly limit movement of the wheel attachment structure such that movement of the wheel attachment structure terminates at a first position thereof when sufficiently pivoted in a first pivot direction about the pivot axis and such that movement of the wheel attachment structure terminates at a second position thereof when sufficiently pivoted in a second pivot direction about the pivot axis. The second-size wheels are each attached to a respective wheel mounting portion of the wheel attachment structure in a manner allowing both of the wheels to rotate about a common rotational axis. The first-size wheels and the second-size wheels simultaneously sit on a common reference plane when the wheel attachment structure is in the first position thereof while the casters are in any pivoted position with respect to the pivot axis thereof and simultaneously sit on the common reference plane when the wheel attachment structure is in the second position thereof while the casters are in any pivoted position with respect to the pivot axis thereof.

In another embodiment of the present invention, a wheeled apparatus for carrying loads comprises a main frame, a pair of first-size wheels, a subframe, and one or more second-size wheels. The main frame has a first end portion and a second end portion. The pair of first-size wheels is attached in a spaced apart arrangement to the main frame at the first end portion thereof. The subframe is moveably attached at a first end portion thereof to the main frame at a position between the first-size wheels and the second end portion of the main frame. The subframe is attached to the main frame in a manner for allowing the subframe to be freely moved between a first position and a second position with respect to the main frame. The subframe and the main frame jointly limit movement of the subframe to be between the first and second positions thereof. The one or more second-size wheel are attached to a second end portion of the subframe. The first-size and second-size wheels jointly provide a first wheelbase length between the first-size wheels and the second-size wheels when the subframe is in the first position thereof and jointly provide a second wheelbase length between the first-size wheels and the second-size wheels when the subframe is in the second position thereof.

In another embodiment of the present invention, a wheeled apparatus for carrying loads comprises a main frame, a pair of casters, a subframe, and a pair of second-size wheels. The main frame has a first end portion and a second end portion. The main frame includes a load supporting structure on a front side thereof. The pair of casters pivotably is attached in a spaced apart arrangement to the main frame at the first end portion thereof. A wheel of each one of the casters is a first-size wheel. The casters are located on a rear side of the main frame and each pivot about a pivot axis extending substantially perpendicular to a rotational axis of a respective one of the caster wheels. The subframe is moveably attached at a first end portion thereof to the main frame at a position between the casters and the second end portion of the main frame. The subframe is attached to the main frame in a manner for allowing the subframe to be freely moved between a first position and a second position with respect to the main frame. The subframe and the main frame jointly limit movement of the subframe to be between the first and second positions thereof. The pair of second-size wheels is attached in a spaced apart arrangement to a second end portion of the subframe. A maximum diameter of the second-size wheels is equal to or greater than a maximum diameter of the first-size wheels. The first-size and second-size wheels all simultaneously sit on a common reference plane when the subframe is in the first position thereof while the casters are in any pivoted position with respect to the pivot axis thereof and simultaneously sit on the common reference plane when the subframe is in the second position thereof while the casters are in any pivoted position with respect to the pivot axis thereof.

In another embodiment of the present invention, a wheeled apparatus for carrying loads comprises a main frame, a single first-size wheel, a subframe, and a pair of second-size wheels. The main frame has a first end portion and a second end portion. The first-size wheel is attached to the main frame at the first end portion thereof. The first-size wheel is pivotably attached to the main frame for being pivoted about a pivot axis extending substantially perpendicular to a rotational axis of the first-size wheel. The subframe is moveably attached at a first end portion thereof to the main frame at a position between the first-size wheel and the second end portion of the main frame. The subframe is attached to the main frame in a manner for allowing the subframe to be freely moved between a first position and a second position with respect to the main frame. The subframe and the main frame are jointly limit movement of the subframe to be between the first and second positions thereof. The second-size wheels are attached in a spaced apart arrangement to a second end portion of the subframe. The first-size and the second-size wheels jointly provide a first wheelbase length between the first-size wheel and the second-size wheels when the subframe is in the first position thereof and jointly provide a second wheelbase length between the first-size wheel and the second-size wheels when the subframe is in the second position thereof.

In view of the disclosures made herein, a skilled person will appreciate that a hand truck (or other suitably/similarly configured wheeled apparatus) can have forward wheels (e.g., near the hand truck's toe plate) that are smaller than on a conventional hand truck. This is because, for a wheeled apparatus configured in accordance with an embodiment of the present invention, the smaller wheels are not used for traversing obstacles stairs, curbs or the like. The rear wheels of a wheeled apparatus configured in accordance with an embodiment of the present invention can be much larger than the forward wheels on a conventional hand truck without increasing operator strain because they are not used to pivot the load from the vertical loading position to the mobile orientation. As described, the rear wheels (i.e., secondary wheels) contact the ground when such a wheeled apparatus is in its short wheelbase use configuration (i.e., mobile closed configuration) and in its long wheelbase use configuration (i.e., mobile open configuration). As such, when the wheeled apparatus is pulled, the rear wheels are the first wheels to contact obstacles such as curbs and stairs. When the rear wheels contact a substantial obstacle (e.g., a stair), engagement of the rear wheels with the obstacle causes the wheeled apparatus to automatically transform from its long wheelbase use configuration to its short wheelbase use configuration, thereby making it easier to pull the wheeled apparatus over the obstacle because of the relatively large diameter of the rear wheels.

These and other objects, embodiments, advantages and/or distinctions of the present invention will become readily apparent upon further review of the following specification, associated drawings and appended claims.

DETAILED DESCRIPTION OF THE DRAWING FIGURES

Referring now to FIGS. 4-7, a hand truck 100 configured in accordance with a first embodiment of the present invention is shown. The hand truck 100 comprises a main frame 102, a load platform 104, a pair of casters 106, a subframe 108, and a pair of second-size wheels 110. The load platform 104 is attached to a first end portion 112 of the main frame 102. A load platform for a hand truck is sometimes also referred to as, a toe plate, which serves as a load support structure. The load platform 104 extends forward of a front side 114 of the main frame 102. In one embodiment, a chassis configured in accordance with the present invention can include the main frame 102 (i.e., an elongated frame) and the load platform 104 (i.e., a load support structure). The front side 114 of the main frame 102 is generally defined as the side of the main frame 102 that is engagable by a load (e.g., boxes) supported on the load platform 104. The front side 114 of the main frame 102 includes front facing portions of generally U-shaped frame 116 and front facing portions of cross members 118 connected to the frame 116. A closed end 119 of the frame 116 serves as a hand-gripping portion and legs 121 of the frame 116 at its open end are joined by the load platform 104. Preferably, but not necessarily, the load platform 104 is a flat plate attached perpendicularly to the legs 121 of the frame 116. Jointly, a chassis of the hand truck 100 includes the main frame 102 and the load platform 104.

The casters 106 are attached in a spaced apart arrangement to the main frame 102 at its first end portion 112 through caster mounts 113 of the main frame 102. The casters 106 are each located on a rear side 120 of the main frame 102. The rear side 120 of the main frame 102 is generally opposite the front side 114 of the main frame 102. The casters 106, which include first-size wheels 122, are each pivotably attached to the main frame 102 for being pivoted about a caster pivot axis PA1 that extends substantially perpendicular to a rotational axis RA1 of a respective one of the first-size wheels 122 and that extends in a substantially skewed orientation with respect to a load support surface 124 of the load platform 104 and the front side 114 of the main frame 102. It is disclosed herein that, in at least one embodiment of the present invention, the casters 106 can be replaced by non-caster wheels or wheel assemblies.

The subframe 108 is pivotably attached at a first end portion 126 to the main frame 102 at a position between the casters 106 and the closed end portion 119 of the frame 116 (i.e., a second end portion of the main frame 102). The subframe 108 is attached to the main frame 102 in a manner for allowing the subframe 108 to be freely pivoted about a pivot axis PA2 of the subframe 108 between a first subframe position P1 and a second subframe position P2 with respect to the main frame 102. The subframe 108 and the main frame 102 jointly limit movement of the subframe 108 to be between the first subframe position P1 and second subframe position P2 with respect to the main frame 102.

The subframe 108 includes spaced apart subframe members 130, a subframe pivot axle 132, and a subframe wheel axle 134. The spaced apart subframe members 130 are trapezoid shaped. The subframe pivot axle 132 is attached to a first end portion 134 of each one of the subframe members 130 (i.e., the first end portion 126 of the subframe 108) and the subframe wheel axle 134 is attached to a second end portion 136 of each one of the subframe members 130 (i.e., a second end portion 138 of the subframe 108). Preferably, but not necessarily, the subframe pivot axle 132 and the subframe wheel axle 134 can both be made from a metal bar or rod and the subframe members can be made from channelled steel. The subframe pivot axle 132 is pivotably attached to spaced apart pivot axle supports 140 of the main frame 102, thereby providing a subframe pivot axis PA2 about which the subframe 108 pivots.

The second-size wheels 110 are rotatably mounted in the subframe wheel axle 134 and rotate about a rotation axle RA2 defined by the subframe wheel axle 134. Preferably, the subframe pivot axle 132 and the subframe wheel axle 134 are arranged such that the rotation axis RA2 about which the second-size wheels 110 rotate extends substantially parallel with the subframe pivot axis PA2. As depicted, a track width of the second-size wheels 110 can be greater than a track width of the first-size wheels 122. Alternatively, the track width of the second-size wheels 110 can be less or approximately equal to the track width of the first-size wheels 122. It is disclosed herein that an apparatus configured in accordance with the present invention can have only one second-size wheel attached to the subframe with such single second-size wheel being positioned within a track width of a pair of first-size wheels (e.g., centered between a track width of a pair of first-size wheels. It is disclosed herein that, in at least one embodiment of the present invention, the second-size wheels can be replaced by casters.

Figure 4:
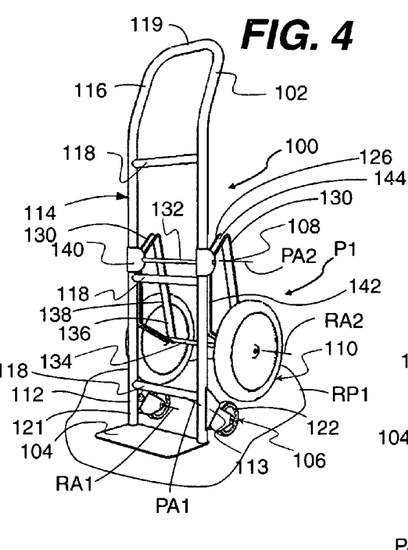
FIG. 4 is a perspective view showing a hand truck configured in accordance with a first embodiment of the present invention, wherein the hand truck is in a vertical loading orientation.

As shown in FIGS. 4-7, the subframe 108 can be freely pivoted about the subframe pivot axis PA2 between the first subframe position P1 and the second subframe position P2. When the hand truck 100 is in its vertical position with the load platform 104 flat on the reference plane RP1 (i.e., a support surface) as shown in FIG. 4, gravity causes the subframe 108 to pivot into its first subframe position P1. The subframe members 130 are shaped for allowing the second-size wheels 110 to be mounted in a manner such that the second-size wheels 110 do not extend forward of the front face 114 of the main frame 102, do not interfere with a load supported by the hand truck 100, and, do not interfere with pivoting of the first size wheels 122 about their respective pivot axis PA1. Preferably, but not necessarily, the subframe members 130 are shaped such that the second-size wheels 110 do not extend forward of a rear face 120 of the main frame 102.

Figure 5:
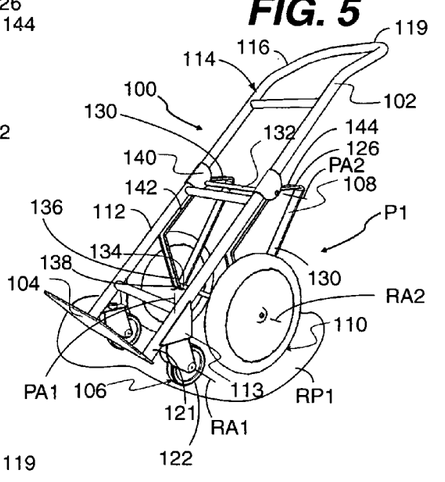
FIG. 5 is a perspective view showing the hand truck of FIG. 4 in a short wheelbase use configuration.
Figures 6, 7:
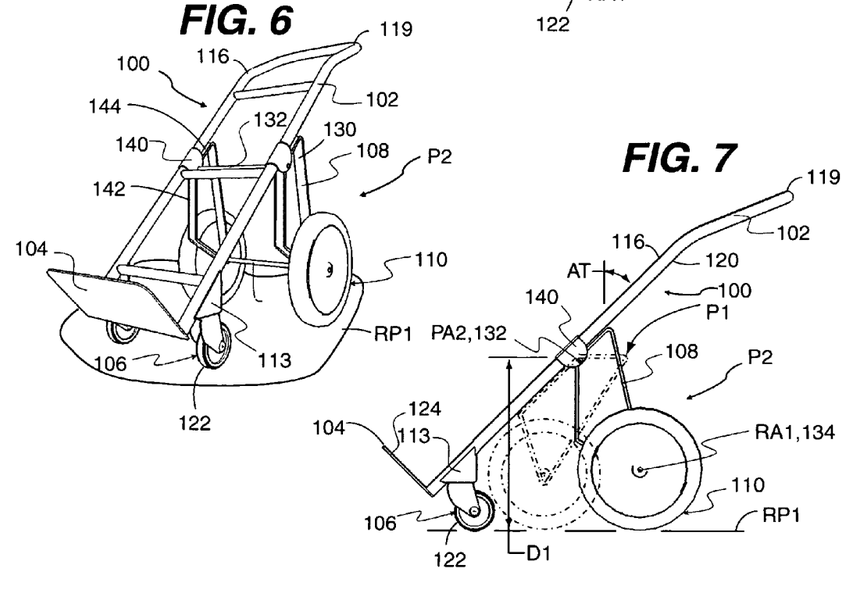
FIG. 6 is a perspective view showing the hand truck of FIG. 1 in a long wheelbase use configuration.
FIG. 7 is a side view of the hand truck of FIG. 1 showing relative positioning of a subframe of the hand truck when in its short and long wheelbase use configurations.

When the hand truck 100 (or other wheeled apparatuses configured in accordance with the present invention) is in its loading orientation (FIG. 4), the toe plate 104 and the first size wheels 122 are in contact with the common reference plane RF1, thereby holding the first size wheels 122 in a pivoted orientation with respect to their pivot PA1 such that their rotational axes RA1 are parallel with the rotational axis RA2 of the subframe wheel axle 134. When the hand truck 100 is tilted back from its loading orientation (FIG. 4), the hand truck 100 pivots about the rotational axis RA1 of the first-size wheels 122. With sufficient pivoting, the second-size wheels 110 come into contact with the common reference plane RP1 and the subframe 108 is held in the first subframe position P1 by weight of the hand truck 100, thereby providing the hand truck 100 in its short wheelbase use configuration, as is shown in FIGS. 5 and 7. In its short wheelbase use configuration, the hand truck 100 can be moved easily with the four wheels of the hand truck 100 supporting its entire weight and any load thereon. If additional stability is required, the subframe 108 can be moved to the second subframe position P2, thereby putting the hand truck 100 in its long wheelbase use configuration (FIGS. 6 and 7), which is useful for loads with a high center of gravity. As can be seen, the subframe 108 is held in the second subframe position P2 by weight of the hand truck 100.

Beneficially, the position of the subframe wheel axle 134 makes it easier to move the hand truck 100 from the loading orientati on to the short wheelbase use configuration. A prior art hand truck uses 6" or 8" inch wheels, placing the axle 3" to 4" from the ground and frame of the hand truck. When attempting to tilt the prior art hand truck from the loading orientation to its tilted configuration when loaded with a large heavy load, the operator places their foot on the axle and leans their body backwards as leverage. Whether they are successful in tilting the load often depends on the size, strength and weight or the operator. In contrast, the position of the subframe wheel axle 134 of the hand truck 100 is considerably higher from the ground when the hand truck 100 is in the loading position LP (e.g., 10" from the ground). As such, a user is provided with much greater leverage, thus making it easier to tilt heavier loads.

When rotated sufficiently about the subframe pivot axis PA2 in a first angular direction, a first upper edge portion 142 of each subframe member 130 contacts the main frame 102 thereby stopping pivoting of the subframe 102 at the first subframe position P1. When rotated sufficiently about the subframe pivot axis PA2 in a second angular direction opposite the first angular direction, a second upper edge portion 144 of each subframe member 130 contacts the main frame 102 thereby stopping pivoting of the subframe 102 at the second subframe position P2. In this manner, the subframe 108 engages a first mating portion of the main frame 102 when in the first subframe position P1 such that movement of the subframe 108 terminates at the first subframe position P1 when sufficiently pivoted in the first pivot direction about the subframe pivot axis PA2 and the subframe 108 engages a second mating portion of the main frame 102 when in the second subframe position P2 thereof such that movement of the subframe 108 terminates at the second subframe position P2 when sufficiently pivoted in the second pivot direction about the subframe pivot axis PA2. Thus, such pivoting action of the subframe 108 with respect to the main frame 102 allows the second-size wheels 110 be freely moved for providing the hand truck 100 with a short wheel configuration when the subframe 108 is at the first subframe position P1 and a long wheelbase use configuration when the subframe 108 is at the second subframe position P2. The geometry of a wheeled apparatus configured in accordance with the present invention (e.g., the hand truck 100) is such that gravity engages the subframe with the main frame for holding the wheeled apparatus in its long and short wheelbase use configurations without any need for latches or other securing mechanisms.

As depicted in FIGS. 4-7, a maximum diameter of the second-size wheels 110 can be greater than a maximum diameter of the first-size wheels 122. It is disclosed herein that the maximum diameter of the second-size wheels 110 can be smaller than or approximately the same as the maximum diameter of the first-size wheels 122. Regardless of the diameter of the first-size wheels 122 and second-size wheels 110, it is preferable that a position and/or the maximum diameter of the first-size wheels 122 and a position and/or the maximum diameter of the second-size wheels 110 be jointly configured for allowing the first-size wheels 122 to each be pivoted fully around the respective caster pivot axis PA 1 without coming into contact with an adjacent one of the second-size wheels 110 (i.e., wheels on a common side of the main frame 102) when the subframe 108 is in the first subframe position P1. This caster pivoting functionality is preferably provided in all wheeled apparatuses of the present invention that have a caster-wheel configuration similar to that of the hand truck 100 of FIGS. 4-7.

It is disclosed herein that the subframe members 130, the subframe pivot axle 132, and the subframe wheel axle 134 jointly define an embodiment of a wheelbase varying assembly configured in accordance with the present invention. However, it is also disclosed herein that such a wheelbase varying assembly need not include two subframe members and need not include a subframe pivot axle and/or a subframe wheel axle. For example, a wheelbase varying assembly can include a single subframe member to which second size wheels are attached using a bolt or the like that serve as discrete axles for a respective one of the second-size wheels. Such a single frame member can be attached to a main frame via an integral subframe axle, via a subframe axle that is integral with the main frame, or via one or more bolts that pivotably secure the subframe member to the mainframe.

As shown in FIG. 7, for a given angular tilt AT (e.g., 45-degrees from vertical) of the main frame 102 with respect to a common reference plane RP1 (e.g., a flat support surface), the first-size wheels 122 and the second-size wheels 110 all simultaneously sit on the common reference plane RP1 when the subframe 108 is in the first subframe position P1 and while the first-size wheels 122 are in any pivoted position with respect to the caster pivot axis PA1 and simultaneously sit on the common reference plane RP1 when the subframe 108 is in the second subframe position P2 while the first-size wheels are in any pivoted position with respect to the caster pivot axis PA1. To this end, it can be seen that the subframe 108 and the main frame 102 are jointly configured such that the subframe pivot axis PA2 is at a distance D1 above the common reference plane RP1 when the subframe is in the first subframe position P1 and in the second subframe position P1. As such, for a given flat support surface, a tilted orientation of the main frame 102 stays the same regardless of whether the subframe 108 is in the first subframe position P1 or the second subframe position P2. From a geometry standpoint, this means that an arc that the subframe 108 travels though between the first and second subframe positions P1, P2 is bisected by a reference axis that extends perpendicular to the common reference plane RP1 through the second pivot axis PA2. Accordingly, the angular tilt of the main frame 102 when the subframe is in the first subframe position P1 and when in the second subframe position P2 can be controlled through angular position of the subframe 108 when movement of the subframe 108 is terminated by contact with the mainframe 102 at the first subframe position P1 and angular position of the subframe 108 when movement of the subframe 108 is terminated by contact with the mainframe 102 at the second subframe position P2. It is disclosed herein that the subframe 108 and/or the main frame 102 can include adjustable stops for allowing the subframe positions P1, P2 to be selectively adjustable.

Figure 8:
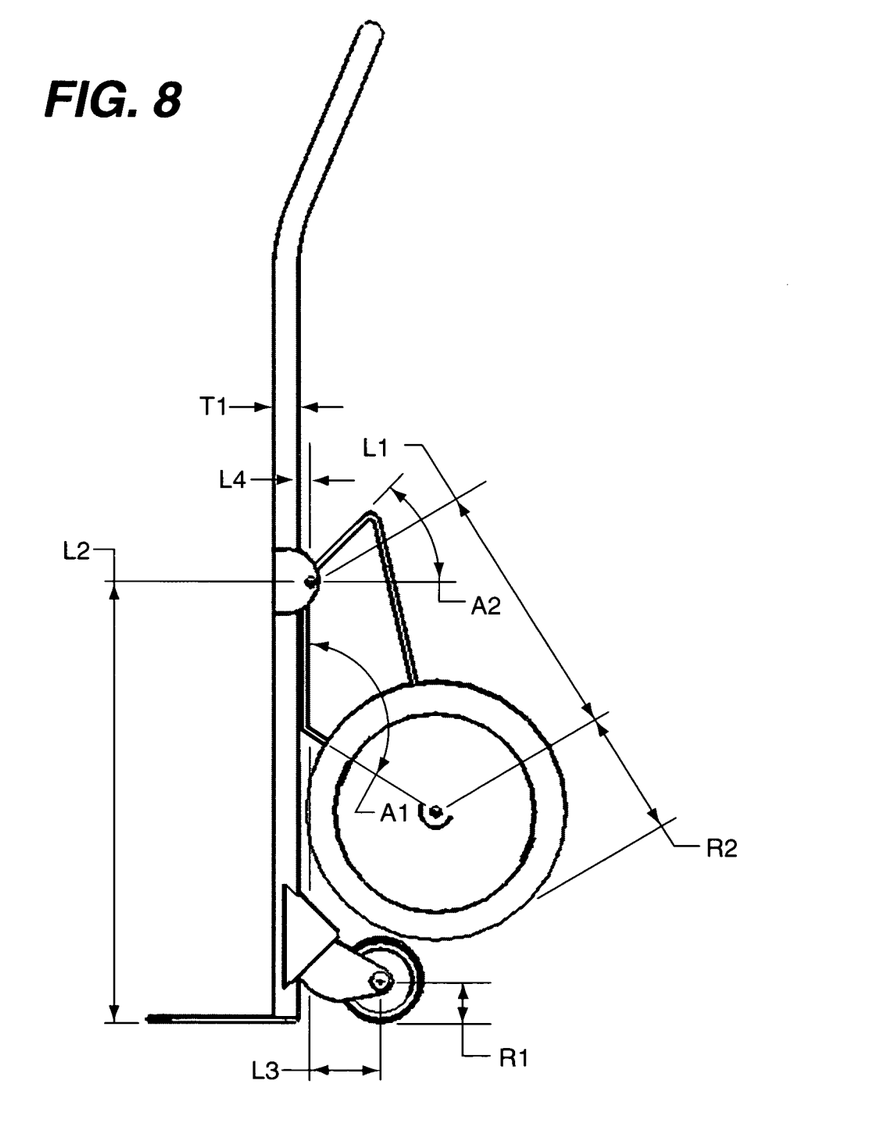
FIG. 8 is a side view of the hand truck of FIG. 1 showing various design dimensions.

Referring to FIG. 8, dimensions relating to wheelbase varying functionality of the hand truck 100 of FIGS. 4-7 are shown. In one example, which is not limiting of dimensions for apparatuses configured in accordance with the present invention, values for these dimensions are provided below in Table 1.

TABLE 1

Example of Hand Truck Dimensions

| Dimension | Value |
| --- | --- |
| L1 | 14.125" |
| L2 | 24.125" |
| L3 | 3.375" |
| L4 | 0.625" |
| R1 | 2" |
| R2 | 7" |
| A1 | 135-degrees |
| A2 | 45-degrees |
| T1 | 1.00" |

Referring now to FIGS. 9-12, a hand truck 200 configured in accordance with a second embodiment of the present invention is shown. The underlying construction and functionality of the hand truck 200 is the same as that of the hand truck 100. However, the hand truck 200 employs bent tubular members in its subframe construction as opposed to the trapezoidal shaped channelled subframe members of the hand truck 100.

The hand truck 200 comprises a main frame 202, a load platform 204, a pair of casters 206, a subframe 208, and a pair of second-size wheels 210. The load platform 204 is attached to a first end portion 212 of the to the main frame 202. The load platform 204 extends forward of a front side 214 of the main frame 202. The front side 214 of the main frame 202 is generally defined as the side of the main frame 202 that is engagable by a load (e.g., boxes) supported on the load platform 204. The front side 214 of the main frame 202 includes front facing portions of generally U-shaped frame 216 and front facing portions of cross members 218 connected to the frame 216. A closed end 219 of the frame 216 serves as a hand-gripping portion and the legs 221 of the frame 216 at its open end are joined by the load platform 204. Preferably, but not necessarily, the load platform 204 is a flat plate attached perpendicularly to the legs 221 of the frame 216. Jointly, a chassis of the hand truck 200 includes the main frame 202 and the load platform 204.

The casters 206 are attached in a spaced apart arrangement to the main frame 202 at its first end portion 212 through caster mounts 213 of the main frame 202. The casters 206 are each located on a rear side 220 of the main frame 202. The rear side 220 of the main frame 202 is generally opposite the front side 214 of the main frame 202. The casters 206, which include first-size wheels 222, are each pivotably attached to the main frame 202 for being pivoted about a caster pivot axis PA1 that extends substantially perpendicular to a rotational axis RA1 of a respective one of the first-size wheels 222 and that extends in a substantially skewed orientation with respect to a load support surface 224 of the load platform 204 and the front side 214 of the main frame 202.

The subframe 208 is pivotably attached at a first end portion 226 to the main frame 202 at a position between the casters 206 and the closed end portion 219 of the frame 216 (i.e., a second end portion of the main frame 202). The subframe 208 is attached to the main frame 202 in a manner for allowing the subframe 208 to be freely pivoted about a pivot axis PA2 of the subframe 208 between a first subframe position P1 and a second subframe position P2 with respect to the main frame 202. The subframe 208 and the main frame 202 jointly limit movement of the subframe 208 to be between the first subframe position P1 and second subframe position P2.

The subframe 208 includes spaced apart subframe members 230, a subframe pivot axle 232, and a subframe wheel axle 234. The spaced apart subframe members 230 are bent tubular members. The subframe pivot axle 232 is attached to a first end portion 234 of each one of the subframe members 230 (i.e., the first end portion 226 of the subframe 208) and the subframe wheel axle 234 is attached to a second end portion 236 of each one of the subframe members 230 (i.e., a second end portion 238 of the subframe 208). Preferably, but not necessarily, the subframe pivot axle 232 and the subframe wheel axle 234 can both be made from a metal bar or rod and the subframe members can be made from steel tubing. The subframe pivot axle 232 is pivotably attached to spaced apart pivot axle supports 240 of the main frame 202, thereby providing a subframe pivot axis PA2 about which the subframe 208 pivots with respect to the main frame 202.

The second-size wheels 210 are rotatably mounted in the subframe wheel axle 234 and rotate about a rotation axle RA2 defined by the subframe wheel axle 234. Preferably, the subframe pivot axle 232 and the subframe wheel axle 234 are arranged such that the rotation axis RA2 about which the second-size wheels 210 rotate extends substantially parallel with the subframe pivot axis PA2. As depicted, a track width of the second-size wheels 210 can be greater than a track width of the first-size wheels 222. Alternatively, the track width of the second-size wheels 210 can be less or approximately equal to the track width of the first-size wheels 222.

Figure 9:
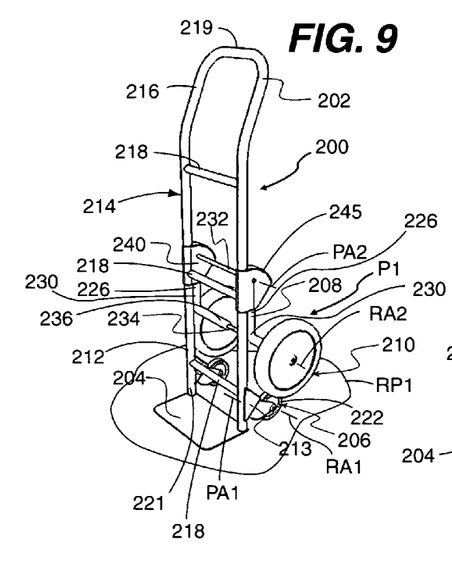
FIG. 9 is a perspective view showing a hand truck configured in accordance with a second embodiment of the present invention, wherein the hand truck is in a vertical loading orientation.

As shown in FIGS. 9-12, the subframe 208 can be freely pivoted about the subframe pivot axis PA2 between the first subframe position P1 and the second subframe position P2. When the hand truck 200 is in its vertical position with the load platform 204 flat on the reference plane RP1 (i.e., a support surface) as shown in FIG. 9, gravity causes the subframe 208 to pivot into its first subframe position P1. The subframe members 230 are shaped for allowing the second-size wheels 210 to be mounted in a manner such that the second-size wheels 210 do not extend forward of the front face 214 of the main frame 202, do not interfere with a load supported by the hand truck 200, and, do not interfere with pivoting of the first size wheels 222 about their respective pivot axis PA1. Preferably, but not necessarily, the subframe members 230 are shaped such that the second-size wheels 210 do not extend forward of the rear face 220 of the main frame 202.

Figure 10:
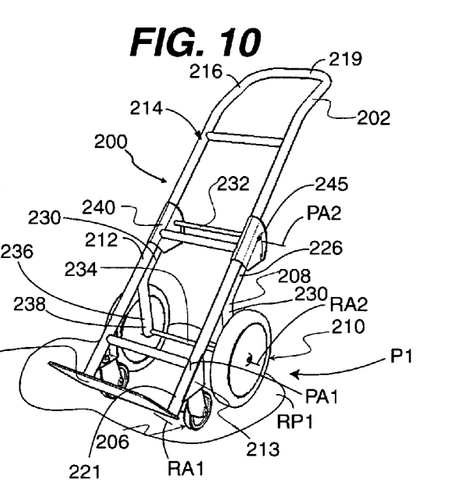
FIG. 10 is a perspective view showing the hand truck of FIG. 9 in a short wheelbase use configuration.
Figures 11, 12:
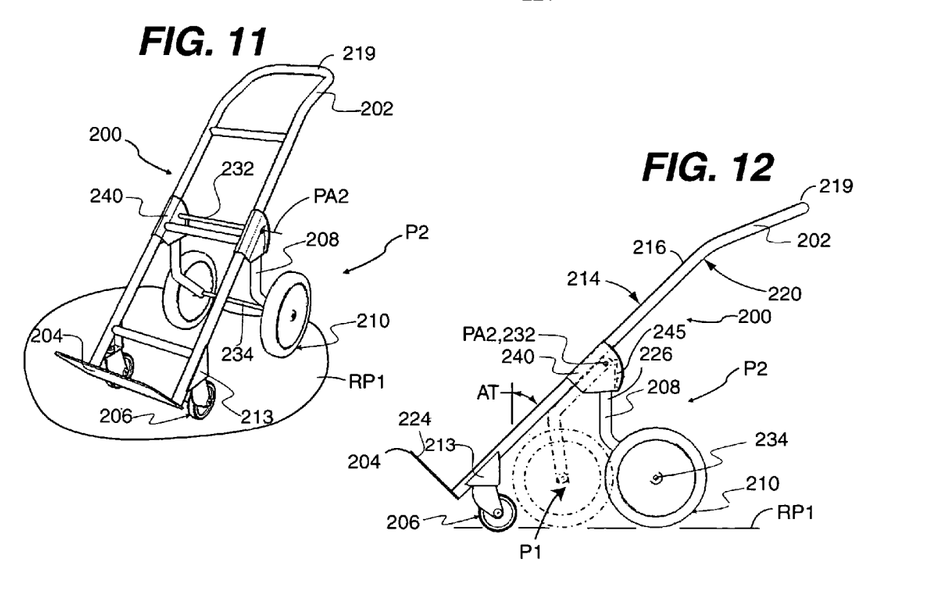
FIG. 11 is a perspective view showing the hand truck of FIG. 9 in a long wheelbase use configuration.
FIG. 12 is a side view of the hand truck of FIG. 9 showing relative positioning of a subframe of the hand truck when in its short and long wheelbase use configurations.

When the hand truck 200 is tilted back from its loading orientation (FIG. 9), the hand truck 200 pivots about the rotational axis RA1 of the first-size wheels 222. With sufficient pivoting, the second-size wheels 210 come into contact with the common reference plane RP1 and the subframe 208 is held in the first subframe position P1 by weight of the hand truck 200, thereby providing the hand truck 200 in its short wheelbase use configuration, as is shown in FIGS. 10 and 12. In its short wheelbase use configuration, the hand truck 200 can be moved easily with the four wheels of the hand truck 200 supporting its entire weight and any load thereon. If additional stability is required, the subframe 208 can be moved to the second subframe position P2, thereby putting the hand truck 200 in its long wheelbase use configuration (FIGS. 11 and 12), which is useful for loads with a high center of gravity. As can be seen, the subframe 208 is held in the second subframe position P2 by weight of the hand truck 200.

When rotated sufficiently about the subframe pivot axis PA2 in a first angular direction, the first end portion 226 of each subframe member 230 contacts the main frame 202 thereby stopping pivoting of the subframe 202 at the first subframe position P1. When rotated sufficiently about the subframe pivot axis PA2 in a second angular direction opposite the first angular direction, the first end portion 226 of each subframe member 230 contacts a subframe stopping portion 245 of the pivot axle supports 240 thereby stopping pivoting of the subframe 202 at the second subframe position P2. The subframe stopping portion 245 of each pivot axle support 240 can be any suitable structure that is configured for contacting the first end portion 226 of each subframe member 230 for limiting its rotation about the subframe pivot axis PA2 (e.g., a piece of material or fastener that is fixedly attached to the subframe member 230 and that blocks the path of travel of the first end portion 226 of each subframe member 230). In this manner, the subframe 208 engages a first mating portion of the main frame 202 when in the first subframe position P1 such that movement of the subframe 208 terminates at the first subframe position P1 when sufficiently pivoted in the first pivot direction about the subframe pivot axis PA2 and the subframe 208 engages a second mating portion of the main frame 202 (i.e., the pivot axle supports 240 can be part of the main frame 202) when in the second subframe position P2 thereof such that movement of the subframe 208 terminates at the second subframe position P2 when sufficiently pivoted in the second pivot direction about the subframe pivot axis PA2. Thus, such pivoting action of the subframe 208 with respect to the main frame 202 allows the second-size wheels 110 be freely moved for providing the hand truck 200 with a short wheel configuration when the subframe 208 is at the first subframe position P1 and a long wheelbase use configuration when the subframe 208 is at the second subframe position P2.

Referring now to FIGS. 13-16, a hand truck 300 configured in accordance with a third embodiment of the present invention is shown. The underlying construction and functionality of the hand truck 300 is the same as that of the hand truck 100. However, the hand truck 300 employs T-shaped subframe members in its subframe construction as opposed to the trapezoidal shaped channelled subframe members of the hand truck 100 (FIGS. 4-7) or the bent tubular members of the hand truck 200 (FIGS. 9-12).

The hand truck 300 comprises a main frame 302, a load platform 304, a pair of casters 306, a subframe 308, and a pair of second-size wheels 310. The load platform 304 is attached to a first end portion 312 of the to the main frame 302. The load platform 304 extends forward of a front side 314 of the main frame 302. The front side 314 of the main frame 302 is generally defined as the side of the main frame 302 that is engagable by a load (e.g., boxes) supported on the load platform 304. The front side 314 of the main frame 302 includes front facing portions of generally U-shaped frame 316 and front facing portions of cross members 318 connected to the frame 316. A closed end 319 of the frame 316 serves as a hand-gripping portion and legs 321 of the frame 316 at its open end are joined by the load platform 304. Preferably, but not necessarily, the load platform 304 is a flat plate attached perpendicularly to the legs 321 of the frame 316. Jointly, a chassis of the hand truck 300 includes the main frame 302 and the load platform 304.

The casters 306 are attached in a spaced apart arrangement to the main frame 302 at its first end portion 312 through caster mounts 313 of the main frame 302. The casters 306 are each located on a rear side 320 of the main frame 302. The rear side 320 of the main frame 302 is generally opposite the front side 314 of the main frame 302. The casters 306 (i.e., first-size wheels 322 thereof) are each pivotably attached to the main frame 302 for being pivoted about a caster pivot axis PA1 extending substantially perpendicular to a rotational axis RA1 of a respective one of the first-size wheels 322 and extending in a substantially skewed orientation with respect to a load support surface 324 of the load platform 304 and the front side 314 of the main frame 302.

The subframe 308 is pivotably attached at a first end portion 326 to the main frame 302 at a position between the casters 306 and the closed end portion 319 of the frame 316 (i.e., a second end portion of the main frame 302). The subframe 308 is attached to the main frame 302 in a manner for allowing the subframe 308 to be freely pivoted about a pivot axis PA2 of the subframe 308 between a first subframe position P1 and a second subframe position P2 with respect to the main frame 302. The subframe 308 and the main frame 302 jointly limit movement of the subframe 308 to be between the first subframe position P1 and second subframe position P2.

The subframe 308 includes spaced apart subframe members 330, a subframe pivot axle 332, and a subframe wheel axle 334. The spaced apart subframe members 330 are tubular members having two frame engaging legs at one end thereof. The subframe pivot axle 332 is attached to a first end portion 334 of each one of the subframe members 330 (i.e., the first end portion 326 of the subframe 308) and the subframe wheel axle 334 is attached to a second end portion 336 of each one of the subframe members 330 (i.e., a second end portion 338 of the subframe 308). Preferably, but not necessarily, the subframe pivot axle 332 and the subframe wheel axle 334 can both be made from a metal bar or rod and the subframe members can be made from steel tubing. The subframe pivot axle 332 is pivotably attached to spaced apart pivot axle supports 340 of the main frame 302, thereby providing a subframe pivot axis PA2 about which the subframe 308 pivots with respect to the main frame 302.

The second-size wheels 310 are rotatably mounted in the subframe wheel axle 334 and rotate about a rotation axle RA2 defined by the subframe wheel axle 334. Preferably, the subframe pivot axle 332 and the subframe wheel axle 334 are arranged such that the rotation axis RA2 about which the second-size wheels 310 rotate extends substantially parallel with the subframe pivot axis PA2. As depicted, a track width of the second-size wheels 310 can be greater than a track width of the first-size wheels 322. Alternatively, the track width of the second-size wheels 310 can be less or approximately equal to the track width of the first-size wheels 322.

Figure 13:
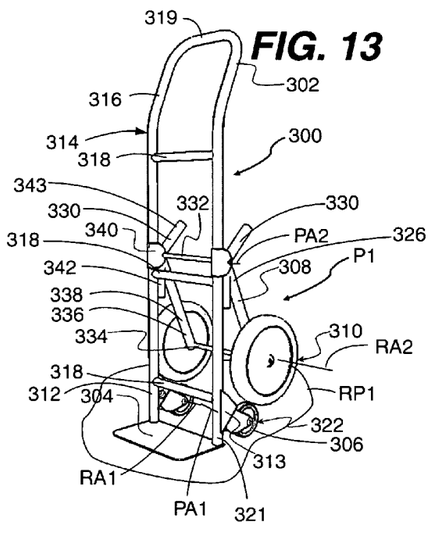
FIG. 13 is a perspective view showing a hand truck configured in accordance with a third embodiment of the present invention, wherein the hand truck is in a vertical loading orientation.

As shown in FIGS. 13-16, the subframe 308 can be freely pivoted about the subframe pivot axis PA2 between the first subframe position P1 and the second subframe position P2. When the hand truck 300 is in its vertical position with the load platform 304 flat on the reference plane RP1 (i.e., a support surface) as shown in FIG. 13, gravity causes the subframe 308 to pivot into its first subframe position P1. The subframe members 330 are shaped for allowing the second-size wheels 310 to be mounted in a manner such that the second-size wheels 310 do not extend forward of the front face 314 of the main frame 302, do not interfere with a load supported by the hand truck 300, and, do not interfere with pivoting of the first size wheels 322 about their respective pivot axis PA1. Preferably, but not necessarily, the subframe members 330 are shaped such that the second-size wheels 310 do not extend forward of the rear face 320 of the main frame 302.

Figure 14:
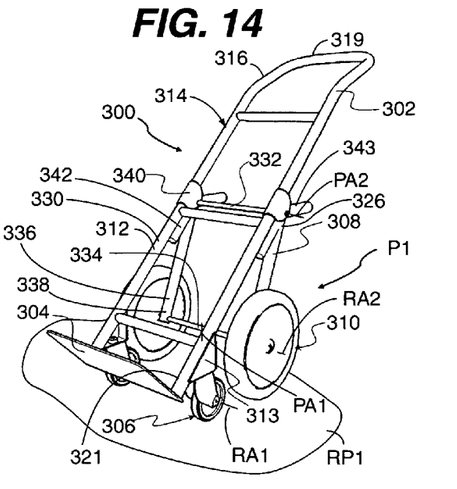
FIG. 14 is a perspective view showing the hand truck of FIG. 13 in a short wheelbase use configuration.
Figures 15, 16:
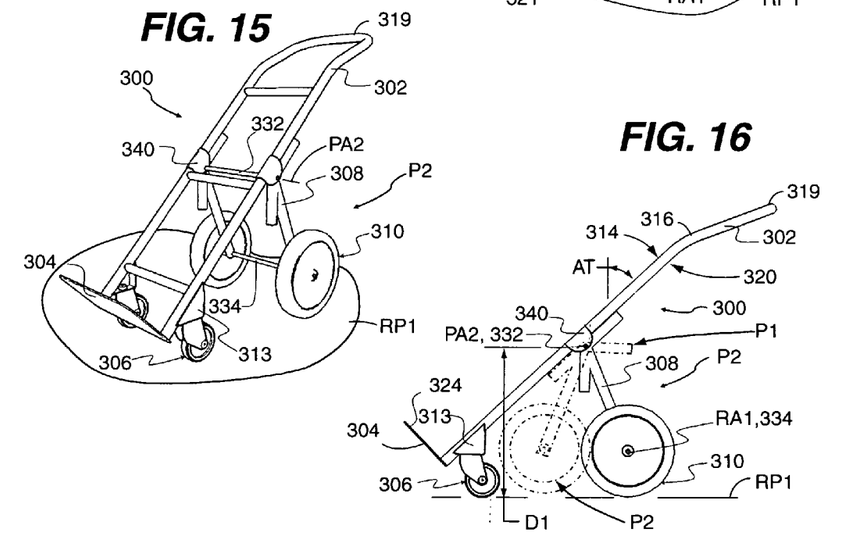
FIG. 15 is a perspective view showing the hand truck of FIG. 13 in a long wheelbase use configuration.
FIG. 16 is a side view of the hand truck of FIG. 13 showing relative positioning of a subframe of the hand truck when in its short and long wheelbase use configurations.

When the hand truck 300 is tilted back from its loading orientation (FIG. 13), the hand truck 300 pivots about the rotational axis RA1 of the first-size wheels 322. With sufficient pivoting, the second-size wheels 310 come into contact with the common reference plane RP1 and the subframe 308 is held in the first subframe position P1 by weight of the hand truck 300, thereby providing the hand truck 300 in its short wheelbase use configuration, as is shown in FIGS. 14 and 16. In its short wheelbase use configuration, the hand truck 300 can be moved easily with the four wheels of the hand truck 300 supporting its entire weight and any load thereon. If additional stability is required, the subframe 308 can be moved to the second subframe position P2, thereby putting the hand truck 300 in its long wheelbase use configuration (FIGS. 15 and 16), which is useful for loads with a high center of gravity. As can be seen, the subframe 308 is held in the second subframe position P2 by weight of the hand truck 300.

When rotated sufficiently about the subframe pivot axis PA2 in a first angular direction, a first frame engaging leg 342 of each subframe member 330 contacts the main frame 302 thereby stopping pivoting of the subframe 302 at the first subframe position P1. When rotated sufficiently about the subframe pivot axis PA2 in a second angular direction opposite the first angular direction, a second frame engaging leg 343 of each subframe member 330 contacts the main frame 302 thereby stopping pivoting of the subframe 302 at the second subframe position P2. In this manner, the subframe 308 engages a first mating portion of the main frame 302 when in the first subframe position P1 such that movement of the subframe 308 terminates at the first subframe position P1 when sufficiently pivoted in the first pivot direction about the subframe pivot axis PA2 and the subframe 308 engages a second mating portion of the main frame 302 when in the second subframe position P2 thereof such that movement of the subframe 308 terminates at the second subframe position P2 when sufficiently pivoted in the second pivot direction about the subframe pivot axis PA2. Thus, such pivoting action of the subframe 308 with respect to the main frame 302 allows the second-size wheels 110 be freely moved for providing the hand truck 300 with a short wheel configuration when the subframe 308 is at the first subframe position P1 and a long wheelbase use configuration when the subframe 308 is at the second subframe position P2.

Figures 17, 18:
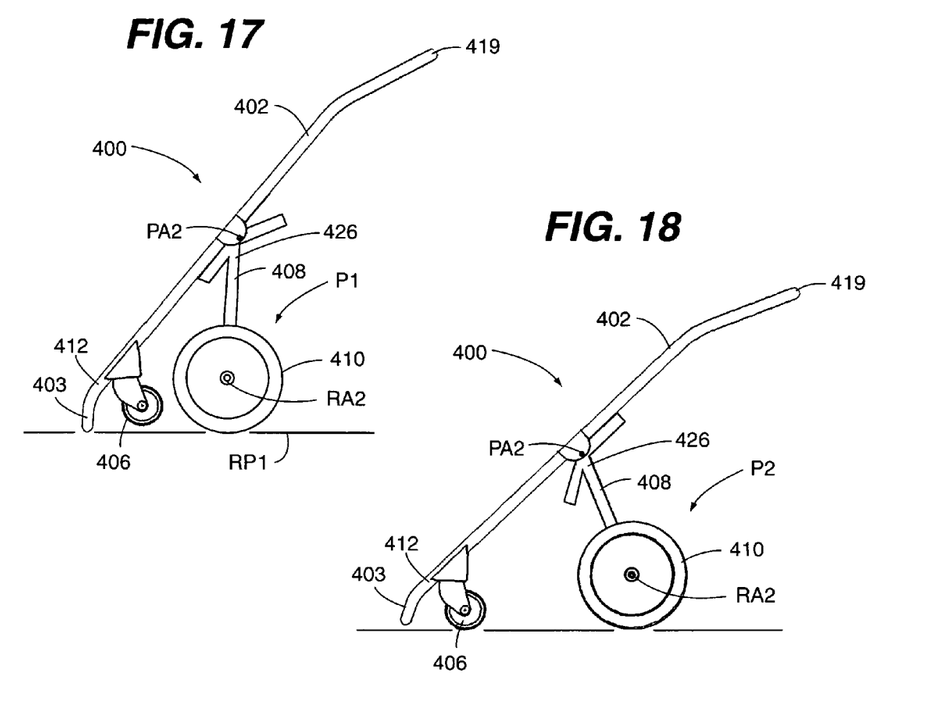
FIG. 17 is a side view showing a wheeled apparatus configured in accordance with a fifth embodiment of the present invention, wherein the wheeled apparatus is in a wheelbase use configuration in which a stop structure inhibits free rolling of the wheeled apparatus.
FIG. 18 is a side view showing the wheeled apparatus of FIG. 17, wherein the wheeled apparatus is in a wheelbase use configuration allowing free rolling of the wheeled apparatus.
Figure 19:
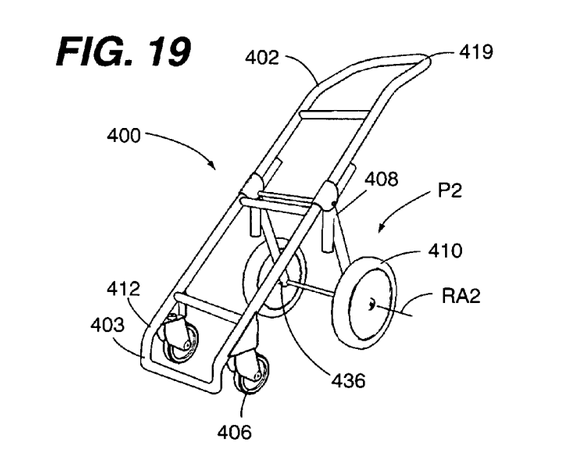
FIG. 19 is a perspective view showing the wheeled apparatus of FIG. 17, wherein the wheeled apparatus is in the wheelbase use configuration allowing free rolling of the wheeled apparatus.

Referring now to FIGS. 17-19, a wheeled apparatus 400 configured in accordance with a fourth embodiment of the present invention is shown. The underlying construction and functionality of the wheeled apparatus 400 is similar to that of the hand truck 300. However, the wheeled apparatus 400 includes a means for precluding the wheeled apparatus 400 from rolling freely when in a first wheelbase use configuration and for allowing the hand truck 400 to roll freely when in a second wheelbase use configuration.

A main frame 402 of the hand truck 400 includes stop structure 403. As shown, the stop structure 403 can be positioned at a first end portion 412 of the main frame 402 forward to front wheels 406 (e.g., first-size wheels) that are also attached to the first end portion 412 of the main frame 402. Alternatively, it is disclosed herein that the stop structure 403 can be positioned at a location between front wheels 406 and rear wheels 410 (e.g., second-size wheels). A subframe 408 is pivotably attached at its first end 426 to the main frame 402 at a position between the front wheels 406 and a second end portion 419 of the main frame 402. The rear wheels 410 are attached in a spaced apart arrangement to the subframe 408 at its second end portion 436 and rotate about a common rotational axis RA2 that extends substantially parallel with a subframe pivot axis PA2 about which the subframe 408 is pivotable.

The subframe 408 is pivotable about the pivot axis PA2 between a first subframe position P1 (FIG. 17) and a second subframe position P2 (FIGS. 18 and 19) with respect to the main frame 402. In a similar manner as for the hand truck 300, the subframe 408 and the main frame 402 jointly limit movement of the subframe 408 to be between the first subframe position P1 and second subframe position P2. As shown in FIG. 17, when the subframe 408 is in its first subframe position P1, the wheeled apparatus 400 is in a short wheelbase whereby the stop structure 403 and rear wheels 410 all simultaneously sit on a common reference plane RP1. As shown in FIGS. 18 and 19, when the subframe 408 is in its second subframe position P2, the wheeled apparatus 400 is in a long wheelbase whereby the front wheels 406 and the rear wheels 410 all simultaneously sit on the common reference plane RP1. In this manner, the wheeled apparatus 400 is precluded from freely rolling when in the short wheelbase use configuration and can be freely rolled when in its long wheelbase use configuration.

It is disclosed herein that the wheeled apparatus 400 can be configured for carrying a load for one or more specific types of intended uses. For example, the main frame 402 can include a load carrying structure that is specifically configured for carrying a particular type of load and/or article(s). In one specific example, the wheeled apparatus 400 can include one or more baskets attached to the main frame 402 for carrying articles such as groceries or other discrete items. In another specific example, the wheeled apparatus 400 can include one or more cradles attached to the main frame 402 for carrying cylindrical bodies such as gas cylinders. In view of the disclosures made herein, a skilled person will appreciate that the wheeled apparatus 400 is not unnecessarily limited to any particular type of application or use.

In view of the disclosures made herein, a skilled person will appreciate that the main frame of a wheeled apparatus configured in accordance with the present invention can be configured for carrying objects such as, for example, groceries, welding tools, beverage cases, gas cylinders, luggage, gardening equipment or other articles. More specifically, in some instances, the main frame and/or the load platform of such a wheeled apparatus can be configured specifically for a particular type of load that the wheeled apparatus is configured for carrying. For example, in a wheeled apparatus specifically configured for carrying a gas cylinder, the main frame and the load platform can both be configured with a respective cradle structure for securely positioning a gas cylinder in place. In another example, a wheeled apparatus can include a main frame having a grocery carrying structure (e.g., one or more shelves or baskets) that are held in a suitable orientation for having groceries stowed therein when the main frame is in a use orientation (e.g., at an approximate 45 degree angle with respect to a horizontal support surface). It is disclosed herein that, in some implementations of a wheeled apparatus in accordance with the present invention, it will be desirable and/or advantageous for a wheelbase of the wheeled apparatus to be defined between a single caster and a pair of fixed-axis wheels (i.e., the second-size wheels disclosed above). It is also discussed herein that, in some implementations of a wheeled apparatus in accordance with the present invention, it will be desirable and/or advantageous for one or more casters to be attached to the subframe assembly and one or more fixed axis wheels to be attached to the main frame.

Certain terminology is used in the descriptions and/or disclosures made herein for convenience only and is not limiting. The words "right," "left," "lower" and "upper" designate directions in the drawings to which reference is made. The words "opened", "closed", "inwardly" and "outwardly" refer to directions toward and away from, respectively, the geometric center of the hand truck and designated parts thereof. The terminology includes the words above specifically mentioned, derivatives thereof and words of similar import. Additionally, the word "a," as used in the claims and the corresponding portions of the specification, means "at least one."

Based on the foregoing description, to those skilled in the art it would be obvious that the invention could be built with different materials and wheel configurations. The exact material and arrangement will vary based on the material be transported and the type of cart the invention is attached to. The methods of attaching the invention to the main frame can also vary, with the primary requirement that the attachment allows the subframe to pivot.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A hand truck, comprising:
a main frame;
a load platform attached to the first end portion of the main frame, wherein the load platform extends forward of a front side of the main frame;
a pair of first-size wheels attached in a spaced apart arrangement to the main frame at the first end portion thereof, wherein said first-size wheels are located on a rear side of the main frame, wherein said first-size wheels are each pivotably attached to the main frame for being pivoted about a pivot axis extending substantially perpendicular to a rotational axis of a respective one of said first-size wheels and extending in a substantially skewed orientation with respect to a load support surface of the load platform;
a subframe pivotably attached at a first end portion thereof to the main frame at a position between said first-size wheels and a second end portion of the main frame, wherein the subframe is attached to the main frame in a manner for allowing the subframe to be freely pivoted between a first position and a second position with respect to the main frame, and wherein the subframe and the main frame jointly limit movement of the subframe to be between said first and second positions thereof; wherein the subframe engages a first mating portion of the frame when in the first position thereof such that movement of the subframe terminates at the first position thereof when sufficiently pivoted in a first pivot direction about a pivot axis of the subframe; and wherein the subframe engages a second mating portion of the frame when in the second position thereof such that movement of the subframe terminates at the second position thereof when sufficiently pivoted in a second pivot direction about the pivot axis of the subframe; and
at least one second-size wheel attached to a second end portion of the subframe, wherein a maximum diameter of said at least one second-size wheel is equal to or greater than a maximum diameter of said first-size wheels.

2. The hand truck of claim 1 wherein:
said at least one second-size wheel being attached to the second end portion of the subframe includes a pair of second-size wheels attached in a spaced apart arrangement to the second end portion of the subframe;
said second-size wheels rotate about a common rotational axis extending substantially parallel with a pivot axis about which the subframe is pivotable; and
a track width of said second-size wheels is greater than a track width of said first-size wheels.

3. The hand truck of claim 2 wherein:
a first wheelbase length between said first-size wheels and said second-size wheels is provided when the subframe is in the first position thereof; a second wheelbase length between said first-size wheels and said second-size wheels is provided when the subframe is in the second position thereof; and
the second wheelbase length is greater than the first wheelbase length.

4. The hand truck of claim 1 wherein:
said at least one second-size wheel rotates about a common rotational axis extending substantially parallel with a pivot axis about which the subframe is pivotable; and
said first-size and second-size wheels all simultaneously sit on a common reference plane when the subframe is in the first position thereof and simultaneously sit on the common reference plane when the subframe is in the second position thereof.

5. The hand truck of claim 1, further comprising:
a stop structure connected to the main frame at the first end portion thereof;
wherein said at least one second-size wheel being attached to the second end portion of the subframe includes a pair of second-size wheels attached in a spaced apart arrangement to the second end portion of the subframe;
wherein said second-size wheels rotate about a common rotational axis extending substantially parallel with a pivot axis about which the subframe is pivotable; wherein the stop structure and second-size wheels all simultaneously sit on a common reference plane when the subframe is in the first position thereof; and wherein said first-size wheels and said second-size wheels simultaneously sit on the common reference plane when the subframe is in the second position thereof.

6. The hand truck of claim 1 wherein:

said at least one second-size wheel rotates about a rotational axis extending substantially parallel with a pivot axis about which the subframe is pivotable; and said first-size and second-size wheels all simultaneously sit on a common reference plane when the subframe is in the first position thereof and simultaneously sit on the common reference plane when the subframe is in the second position thereof.

7. The hand truck of claim 6 wherein:

said at least one second-size wheel being attached to the second end portion of the subframe includes a pair of second-size wheels attached in a spaced apart arrangement to the second end portion of the subframe;

said second-size wheels rotate about a common rotational axis extending substantially parallel with a pivot axis about which the subframe is pivotable; and a track width of said second-size wheels is greater than a track width of said first-size wheels.

8. A hand truck, comprising:

a main frame a load platform attached to a first end portion of the main frame, wherein the load platform extends forward of a front side of the main frame;

a pair of first-size wheels attached in a spaced apart arrangement to the main frame at the first end portion thereof, wherein said first-size wheels are located on a rear side of the main frame, wherein said first-size wheels are each pivotably attached to the main frame for being pivoted about a pivot axis extending substantially perpendicular to a rotational axis of a respective one of said first-size wheels and extending in a substantially skewed orientation with respect to a load support surface of the load platform;

a subframe pivotably attached at a first end portion thereof to the main frame at a position between said first-size wheels and a second end portion of the main frame, wherein the subframe is attached to the main frame in a manner for allowing the subframe to be freely pivoted between a first position and a second position with respect to the main frame, and wherein the subframe and the main frame jointly limit movement of the subframe to be between said first and second positions thereof; and a pair of second-size wheels attached in a spaced apart arrangement to a second end portion of the subframe, wherein a maximum diameter of said second-size wheels is equal to or greater than a maximum diameter of said first-size wheels;

wherein said first-size and second-size wheels all simultaneously sit on a common reference plane when the subframe is in the first position thereof while said first-size wheels are in any pivoted position with respect to the pivot axis thereof and simultaneously sit on the common reference plane when the subframe is in the second position thereof while said first-size wheels are in any pivoted position with respect to the pivot axis thereof; and wherein a load support surface of the load platform is substantially skewed with respect to a reference plane simultaneously extending through a rotational axis of said second-size wheels when the subframe is in the first position and through the rotational axis of said second-size wheels when the subframe is in the second position.

9. The hand truck of claim 8 wherein:

said second-size wheels rotate about a common rotational axis extending substantially parallel with a pivot axis about which the subframe is pivotable; and a track width of said second-size wheels is greater than a track width of said first-size wheels.

10. The hand truck of claim 9 wherein:

a first wheelbase length between said first-size wheels and said second-size wheels is provided when the subframe is in the first position thereof;

a second wheelbase length between said first-size wheels and said second-size wheels is provided when the subframe is in the second position thereof; the second wheelbase length is greater than the first wheelbase length; and the maximum diameter of said first-size wheels and the maximum diameter of said second-size wheels are jointly sized for allowing said first-size wheels to each be pivoted fully around the pivot axis thereof without coming into contact with an adjacent one of said second-size wheels when the subframe is in the first position thereof.

11. The hand truck of claim 8 wherein:

the subframe engages a first mating portion of the frame when in the first position thereof such that movement of the subframe terminates at the first position thereof when sufficiently pivoted in a first pivot direction about a pivot axis of the subframe; and the subframe engages a second mating portion of the frame when in the second position thereof such that movement of the subframe terminates at the second position thereof when sufficiently pivoted in a second pivot direction about the pivot axis of the subframe.

12. The hand truck of claim 11 wherein:

said second-size wheels rotate about a common rotational axis extending substantially parallel with a pivot axis about which the subframe is pivotable; and a track width of said second-size wheels is greater than a track width of said first-size wheels.

13. The hand truck of claim 12 wherein:

a first wheelbase length between said first-size wheels and said second-size wheels is provided when the subframe is in the first position thereof; a second wheelbase length between said first-size wheels and said second-size wheels is provided when the subframe is in the second position thereof;

the second wheelbase length is greater than the first wheelbase length; and the maximum diameter of said first-size wheels and the maximum diameter of said second-size wheels are jointly sized for allowing said first-size wheels to each be pivoted fully around the pivot axis thereof without coming into contact with an adjacent one of said second-size wheels when the subframe is in the first position thereof.

14. The hand truck of claim 8 wherein:

a first wheelbase length between said first-size wheels and said second-size wheels is provided when the subframe is in the first position thereof;

a second wheelbase length between said first-size wheels and said second-size wheels is provided when the subframe is in the second position thereof;

the second wheelbase length is greater than the first wheelbase length; and the maximum diameter of said first-size wheels and the maximum diameter of said second-size wheels are jointly sized for allowing said first-size wheels to each be pivoted fully around the pivot axis thereof without coming into contact with an adjacent one of said second-size wheels when the subframe is in the first position thereof.

15. A hand truck, comprising:
a chassis including an elongated frame and a load support structure attached to the elongated frame at a first end portion thereof, wherein the load support structure extends forward of a front side of the frame;
a pair of first-size wheels attached in a spaced apart arrangement to the main frame at the first end portion thereof, wherein said first-size wheels are located on a rear side of the main frame, wherein said first-size wheels are each pivotably attached to the main frame for being pivoted about a pivot axis extending substantially perpendicular to a rotational axis of a respective one of said first-size wheels and extending in a substantially, skewed orientation with respect to a load support surface of the load platform; and
a wheelbase varying assembly including a wheel attachment structure and a pair of second-size wheels having a maximum diameter equal to or greater than a maximum diameter of said first-size wheels, wherein the wheel attachment structure is pivotably attached at a frame mounting portion thereof to the frame at a position between said first-size wheels and a second end portion of the frame in a manner allowing the wheel attachment structure to be freely pivoted about a pivot axis thereof, wherein the frame and the wheel attachment structure jointly limit movement of the wheel attachment structure such that movement of the wheel attachment structure terminates at a first position thereof when sufficiently pivoted in a first pivot direction about the pivot axis and such that movement of the wheel attachment structure terminates at a second position thereof when sufficiently pivoted in a second pivot direction about the pivot axis, wherein said second-size wheels are each attached to a respective wheel mounting portion of the wheel attachment structure in a manner allowing both of said wheels to rotate about a common rotational axis, and wherein said first-size wheels and said second-size wheels simultaneously sit on a common reference plane when the wheel attachment structure is in the first position thereof while said first-size wheels are in any pivoted position with respect to the pivot axis thereof and simultaneously sit on the common reference plane when the wheel attachment structure is in the second position thereof while said first size wheels are in any pivoted position with respect to the pivot axis thereof.

16. The hand truck of claim 15 wherein said second-size wheels rotate about a common rotational axis extending substantially parallel with the pivot axis about which the wheel attachment structure is pivotable.

17. The hand truck of claim 16 wherein:
a first wheelbase length between said first-size wheels and said second-size wheels is provided when the wheel attachment structure is in the first position thereof;
a second wheelbase length between said first-size wheels and said second-size wheels is provided when the wheel attachment structure is in the second position thereof;
the second wheelbase length is greater than the first wheelbase length; and
the maximum diameter of said first-size wheels and the maximum diameter of said second-size wheels are jointly sized for allowing said first-size wheels to each be pivoted fully around the pivot axis of a respective one of said first size wheels without coming into contact with an adjacent one of said second-size wheels when the wheel attachment structure is in the first position thereof 18. The hand truck of claim 15 wherein:
a first wheelbase length between said first-size wheels and said second-size wheels is provided when the wheel attachment structure is in the first position thereof;
a second wheelbase length between said first-size wheels and said second-size wheels is provided when the wheel attachment structure is in the second position thereof;
the second wheelbase length is greater than the first wheelbase length; and
the maximum diameter of said first-size wheels and the maximum diameter of said second-size wheels are jointly sized for allowing said first-size wheels to each be pivoted fully around the pivot axis thereof without coming into contact with an adjacent one of said second-size wheels when the wheel attachment structure is in the first position thereof.

19. A hand truck, comprising:
a main frame having a first end portion and a second end portion;
a pair of first-size wheels attached in a spaced apart arrangement to the main frame at the first end portion thereof;
a subframe moveably attached at a first end portion thereof to the main frame at a position between said first-size wheels and the second end portion of the main frame, wherein the subframe is attached to the main frame in a manner for allowing the subframe to be freely moved between a first position and a second position with respect to the main frame, and wherein the subframe and the main frame jointly limit movement of the subframe to be between said first and second positions thereof; and
at least one second-size wheel attached to a second end portion of the subframe; and
a stop structure connected to the main frame at the first end portion thereof;
wherein said first-size and second-size wheels jointly provide a first wheelbase length between said first-size wheels and said second-size wheels when the subframe is in the first position thereof and jointly provide a second wheelbase length between said first-size wheels and said second-size wheels when the subframe is in the second position thereof;
wherein said at least one second-size wheel being attached to the second end portion of the subframe includes a pair of second-size wheels attached in a spaced apart arrangement to the second end portion of the subframe;
wherein said second-size wheels rotate about a common rotational axis extending substantially parallel with a pivot axis about which the subframe is pivotable;
wherein the stop structure and second-size wheels all simultaneously sit on a common reference plane when the subframe is in the first position thereof; and
wherein said first-size wheels and said second-size wheels simultaneously sit on the common reference plane when the subframe is in the second position thereof.

20. The apparatus of claim 19 wherein a maximum diameter of said second-size wheel is greater than a maximum diameter of said first-size wheels.

21. The apparatus of claim 19 wherein:
said at least one second-size wheel being attached to the second end portion of the subframe includes a pair of second-size wheels attached in a spaced apart arrangement to the second end portion of the subframe; and
a track width of said second-size wheels is greater than a track width of said first-size wheels.

22. The apparatus of claim 21 wherein:
the subframe being moveably attached to the main frame includes the subframe being pivotably attached to the main frame in a manner allowing the subframe to be pivoted about a pivot axis thereof; and
the pivot axis extends substantially parallel to the common rotational axis about which said second-size wheels rotate.

23. The apparatus of claim 22 wherein the second wheelbase length is greater than the first wheelbase length.

24. The apparatus of claim 19 wherein:
the subframe being moveably attached to the main frame includes the subframe being pivotably attached to the main frame in a manner allowing the subframe to be pivoted about a pivot axis thereof; and
said at least one second-size wheel rotates about a rotational axis extending substantially parallel with the pivot axis of the subframe.

25. The apparatus of claim 19 wherein:
the subframe engages a first mating portion of the frame when in the first position thereof such that movement of the subframe terminates at the first position thereof when sufficiently moved in a direction toward the first position; and
the subframe engages a second mating portion of the frame when in the second position thereof such that movement of the subframe terminates at the second position thereof when sufficiently moved in a direction toward the second position.

26. The apparatus of claim 25 wherein:
the subframe being moveably attached to the main frame includes the subframe being pivotably attached to the main frame in a manner allowing the subframe to be pivoted about a pivot axis thereof; and
said at least one second-size wheel rotates about a rotational axis extending substantially parallel with the pivot axis of the subframe.

27. The apparatus of claim 26 wherein:
said at least one second-size wheel being attached to the second end portion of the subframe includes a pair of second-size wheels attached in a spaced apart arrangement to the second end portion of the subframe;
said second-size wheels rotate about a common rotational axis extending substantially parallel with the pivot axis of the subframe; and
a track width of said second-size wheels is greater than a track width of said first-size wheels.

28. A wheeled apparatus for carrying loads, comprising:
a main frame having a first end portion and a second end portion, wherein the main frame includes a load supporting structure on a front side thereof;
a pair of first-size wheels attached in a spaced apart arrangement to the main frame at the first end portion thereof, wherein said first-size wheels are located on a rear side of the main frame, wherein said first-size wheels are each pivotably attached to the main frame for being pivoted about a pivot axis extending substantially perpendicular to a rotational axis of a respective one of said first-size wheels and extending in a substantially skewed orientation with respect to a load support surface of the main frame;
a subframe moveably attached at a first end portion thereof to the main frame at a position between said first-size wheels and the second end portion of the main frame, wherein the subframe is attached to the main frame in a manner for allowing the subframe to be freely moved between a first position and a second position with respect to the main frame, and wherein the subframe and the main frame jointly limit movement of the subframe to be between said first and second positions thereof; and
a pair of second-size wheels attached in a spaced apart arrangement to a second end portion of the subframe, wherein a maximum diameter of said second-size wheels is equal to or greater than a maximum diameter of said first-size wheels;
wherein said first-size and second-size wheels all simultaneously sit on a common reference plane when the subframe is in the first position thereof while said first-size wheels are in any pivoted position with respect to the pivot axis thereof and simultaneously sit on the common reference plane when the subframe is in the second position thereof while said first-size wheels are in any pivoted position with respect to the pivot axis thereof.

29. The apparatus of claim 28, wherein:
the subframe being moveably attached to the main frame includes the subframe being pivotably attached to the main frame in a manner allowing the subframe to be freely pivoted about a pivot axis thereof; and
the main frame and the subframe jointly limit movement of the subframe such that movement of the subframe terminates at a first position thereof when sufficiently pivoted in a first pivot direction about the pivot axis and such that movement of the subframe terminates at a second position thereof when sufficiently pivoted in a second pivot direction about the pivot axis.

30. The apparatus of claim 28 wherein:
said second-size wheels rotate about a common rotational axis extending substantially parallel with the pivot axis about which the subframe is pivotable; and
a track width of said second-size wheels is greater than a track width of said first-size wheels.

31. The apparatus of claim 28 wherein:
a first wheelbase length between said first-size wheels and said second-size wheels is provided when the subframe is in the first position thereof;
a second wheelbase length between said first-size wheels and said second-size wheels is provided when the subframe is in the second position thereof; the second wheelbase length is greater than the first wheelbase length; and
the maximum diameter of said first-size wheels and the maximum diameter of said second-size wheels are jointly sized for allowing said first-size wheels to each be pivoted fully around the pivot axis of a respective one of said first-size wheels without coming into contact with an adjacent one of said second-size wheels when the subframe is in the first position thereof.

32. A hand truck, comprising:
a main frame;
a load platform attached to the first end portion of the main frame, wherein the load platform extends forward of a front side of the main frame;
a pair of first-size wheels attached in a spaced apart arrangement to the main frame at the first end portion thereof, wherein said first-size wheels are located on a rear side of the main frame, wherein said first-size wheels are each pivotably attached to the main frame for being pivoted about a pivot axis extending substantially perpendicular to a rotational axis of a respective one of said first-size wheels and extending in a substantially skewed orientation with respect to a load support surface of the load platform;
a subframe pivotably attached at a first end portion thereof to the main frame at a position between said first-size wheels and a second end portion of the main frame, wherein the subframe is attached to the main frame in a manner for allowing the subframe to be freely pivoted between a first position and a second position with respect to the main frame, and wherein the subframe and the main frame jointly limit movement of the subframe to be between said first and second positions thereof;

at least one second-size wheel attached to a second end portion of the subframe, wherein a maximum diameter of said at least one second-size wheel is equal to or greater than a maximum diameter of said first-size wheels; and a stop structure connected to the main frame at the first end portion thereof;

wherein said at least one second-size wheel being attached to the second end portion of the subframe includes a pair of second-size wheels attached in a spaced apart arrangement to the second end portion of the subframe;

wherein said second-size wheels rotate about a common rotational axis extending substantially parallel with a pivot axis about which the subframe is pivotable;

wherein the stop structure and second-size wheels all simultaneously sit on a common reference plane when the subframe is in the first position thereof; and wherein said first-size wheels and said second-size wheels simultaneously sit on the common reference plane when the subframe is in the second position thereof.

* * * * *